(12) United States Patent
Mullen (10) Patent No.: US 8,824,841 B1
(45) Date of Patent: Sep. 2, 2014

(54) EXPANDED BEAM OPTICAL INSERT

(76) Inventor: David T. Mullen, Chicago, IL (US)

( * ) Notice: Subject to any disclaimer, the term of this patent is extended or adjusted under 35 U.S.C. 154(b) by 47 days.

(21) Appl. No.: 13/606,349

(22) Filed: Sep. 7, 2012

Related U.S. Application Data

(60) Provisional application No. 61/532,227, filed on Sep. 8, 2011.

(51) Int. Cl.
*G02B 6/32* (2006.01)

(52) U.S. Cl.
USPC ............. 385/35; 29/428; 385/33; 385/74

(58) Field of Classification Search
CPC .... G02B 6/423; G02B 6/4231; G02B 6/4244; G02B 6/32; G02B 6/322
USPC ................ 385/31, 33, 35, 73–75, 62, 87
See application file for complete search history.

(56) References Cited

U.S. PATENT DOCUMENTS

| 4,632,505 | A | * | 12/1986 | Allsworth ..................... 385/61 |
| 4,707,067 | A | * | 11/1987 | Haberland et al. ............. 385/90 |
| 5,973,862 | A | * | 10/1999 | Hashizume ................... 359/819 |
| 6,224,467 | B1 | * | 5/2001 | Tanaka et al. .................. 451/42 |
| 7,722,261 | B2 | * | 5/2010 | Kadar-Kallen et al. ......... 385/74 |
| 8,556,521 | B2 | * | 10/2013 | Everett et al. ................... 385/62 |
| 2007/0211999 | A1 | * | 9/2007 | Kobayashi et al. ............. 385/79 |
| 2010/0329612 | A1 | | 12/2010 | Everett et al. | |

* cited by examiner

*Primary Examiner* — Ellen Kim
(74) *Attorney, Agent, or Firm* — Gardner, Linn, Burkhart & Flory, LLP (57) ABSTRACT

An expanded beam optical insert is provided for use in optical data connectors, such as fiber optic connectors or the like. The expanded beam optical insert may be readily assembled, substantially without the use of costly fixturing tools or adhesives, while still allowing the precise positioning of alignment of optical lenses for placement of ferrule assemblies, optical stubs, and the like.

20 Claims, 9 Drawing Sheets

EXPANDED BEAM OPTICAL INSERT

CROSS-REFERENCE TO RELATED APPLICATION

The present application claims the benefit of U.S. provisional application Ser. No. 61/532,227, filed Sep. 8, 2011, which is hereby incorporated herein by reference in its entirety.

FIELD OF THE INVENTION

The present invention is directed to fiber optic connections and, more particularly, to fiber optic connections utilizing expanded beam lenses.

BACKGROUND OF THE INVENTION

Typical expanded beam fiber optic connectors, such as those complying with military specification MIL 83526/20 and 83526/21, require very tight dimensional tolerances and use epoxies or other adhesives to hold lenses and various other components in place, so that an optical signal can be reliably transmitted through the connector without being overly susceptible to contaminants and mechanical shock, vibration, etc. However, it is costly to machine components to very tight tolerances, precise and costly fixtures are needed for maintaining dimensional precision while assembling the optical connector components, and adhesives require time to cure, and typically do not allow for subsequent disassembly or servicing of the connector.

SUMMARY OF THE INVENTION

The present invention provides an expanded beam optical insert for use in fiber optic couplers, which allows for precision alignment of optical lenses and fibers without the use of adhesives, and without need for precise fixtures or tight dimensional tolerances. The optical insert of the present invention accomplishes this with a housing that defines a plurality of tapered passageways, each passageway receiving a respective ball lens and a tapered barrel or sleeve. Each ball lens is centered and secured in one of the tapered passageways by one of the tapered sleeves. The sleeves are press-fit or swaged into the tapered passageways so that the ball lenses are held in compression between the sleeves and the inner surfaces of the tapered passageways, which terminate in respective distal openings that are smaller in diameter than the ball lenses. This centers and holds the lenses in a precise fixed location due to automatic centering caused by the tapered housing passageways. The hollow sleeves receive respective ferrule assemblies or optical stubs, and are typically press-fit to hold these ferrules or stubs in fixed relation relative to the ball lenses, so that the fibers and lenses are maintained in alignment and fixed relation to one another. Because of the tapered surfaces of the housing passageways and hollow sleeves, at least some of the machined or formed components can be manufactured to lower or looser tolerances, without degrading the quality of the optical connection. Moreover, typically no adhesives are needed for holding the lenses and optical fibers and housing in fixed positions relative to one another, due to the press-fit assembly process in which the sleeves and hold the lenses and ferrule assemblies or stubs (containing the optical fibers) in place.

According to one form of the present invention, an expanded beam optical insert includes a housing, a lens, and a tapered hollow sleeve. The housing defines a housing passageway with a tapered inner surface for receiving the tapered hollow sleeve and an optical conduit. The housing passageway extends between proximal and distal openings, with the proximal opening being larger than the distal opening. The lens is also positioned in the housing passageway, near the distal opening, and the lens has a larger diameter than does the distal opening of the passageway so that the lens cannot pass through the distal opening. The sleeve has a tapered outer surface that corresponds to the tapered inner surface of the housing passageway. A distal end portion of the sleeve is disposed toward the distal opening of the housing passageway, and further includes a proximal end portion disposed toward the proximal opening of the housing passageway. The lens is securable in a fixed position relative to the housing, between the distal opening of the housing passageway and the distal end portion of the sleeve, with a compressive axial force applied to the proximal end portion of the sleeve in the direction of the distal opening of the housing passageway, to thereby hold the lens, in compression, in its fixed position relative to the housing.

In one aspect, the housing includes a substantially planar distal mating surface for engagement with a corresponding mating surface of another optical insert. The distance between the lens and the planar distal mating surface is determined by the diameter of the lens, the diameter the distal opening of the housing passageway, and the taper angle of the inner surface of the housing passageway.

In another aspect, the housing passageway has a partial-spherical annular inner surface near the distal opening, and the lens is a spherical lens that seats against the partial-spherical annular inner surface.

In yet another aspect, the tapered inner surface of the housing passageway is a frusto-conical surface, and the outer surface of the tapered hollow sleeve likewise is a frusto-conical surface.

In a further aspect, the housing defines a plurality of the housing passageways, each passageway for supporting a respective lens and sleeve.

In a still further aspect, the optical insert further includes an inner insert body that engages the proximal end portion of the sleeve, to apply the compressive axial force to the proximal end portion of the sleeve and hold the lens in a fixed position.

In another aspect, a lens-mounting end cap in positioned at the housing and defines the distal opening of the housing passageway, with the end cap being engaged by the lens.

Optionally, the optical insert includes an alignment pin that projects outwardly from the housing in a distal direction, near the distal opening of the housing passageway, with the alignment pin configured to engage an alignment bore in another optical insert. The housing may further define an alignment bore near the distal opening of the housing passageway, for receiving the alignment pin of another optical insert.

According to another form of the present invention, a method is provided for assembling an expanded beam optical insert for use in fiber optic couplers. The method includes providing a housing that defines a housing passageway with proximal and distal passageway openings. The housing passageway has an inner surface that tapers from the proximal opening to the distal opening. A lens is positioned in the housing passageway near the distal opening, with the lens having a larger diameter than the distal opening of the housing passageway, so that the lens cannot pass through the distal opening. A tapered hollow sleeve is positioned in the housing passageway, with a distal end portion of the sleeve disposed towards the distal opening of the housing passageway. The sleeve has a tapered outer surface that corresponds to the tapered inner surface of the housing passageway. A compressive axial force is applied to a proximal end portion of the sleeve, in the direction of the distal opening of the housing passageway, to thereby secure and align the lens in a fixed position with the lens seated in the distal opening of the housing passageway.

Accordingly, the expanded beam optical insert of the present invention allows for a faster assembly process by providing a design that is less susceptible to dimensional variations (i.e., its components can be manufactured to lower tolerances), does not require the use of adhesives, and also does not require the use of precise fixturing equipment during assembly. The resulting optical insert can be readily assembled into an optical coupler, which maintains sufficiently precise alignment of the optical components, including lenses and optical fibers, and which is resistant to signal degradation in the presence of contaminants and or mechanical shock.

These and other objects, advantages, purposes, and features of the present invention will become more apparent upon review of the following specifications in conjunction with the drawings.

DESCRIPTION OF THE PREFERRED EMBODIMENTS

Figure 1:
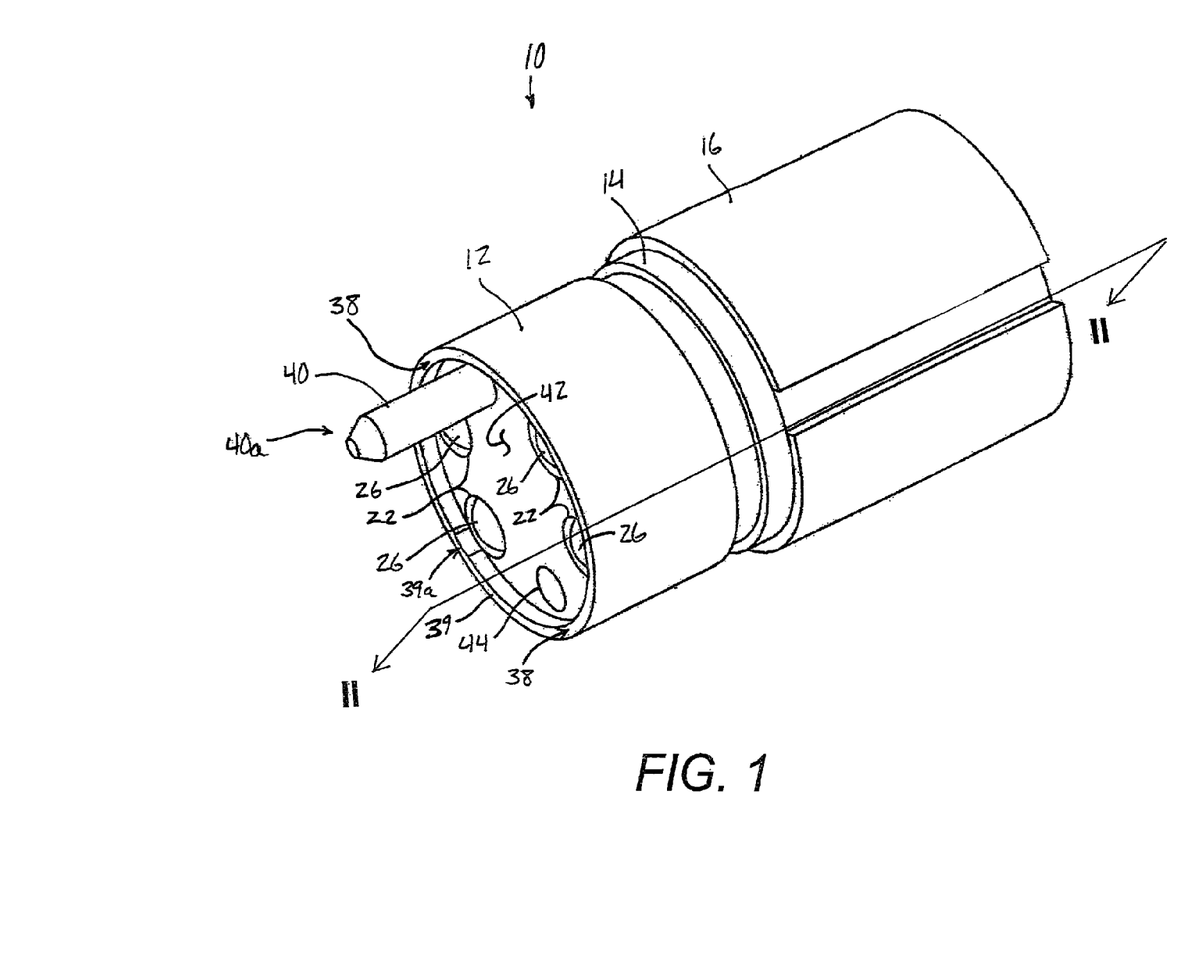
FIG. 1 is a perspective view of an expanded beam optical insert in accordance with the present invention.
Figure 4:
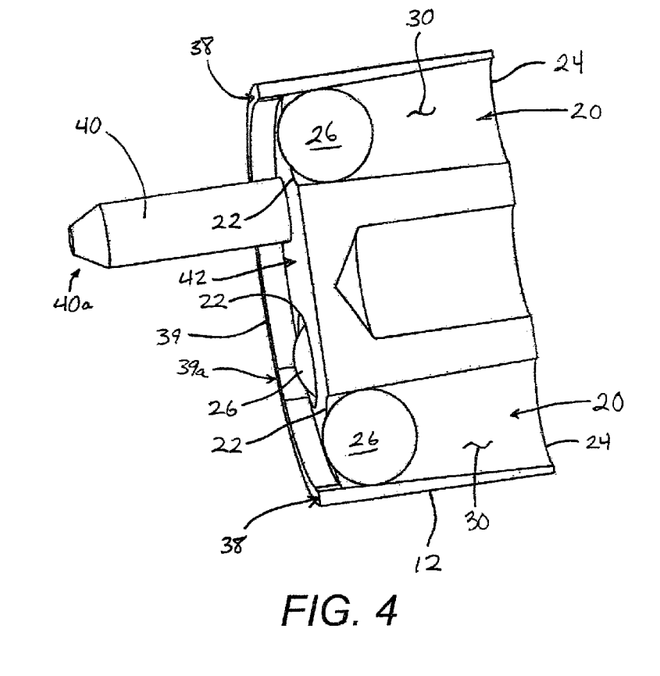
FIG. 4 is a sectional perspective view of the outer insert housing portion of the optical insert, including ball lenses in the housing passageways.
Figure 5:
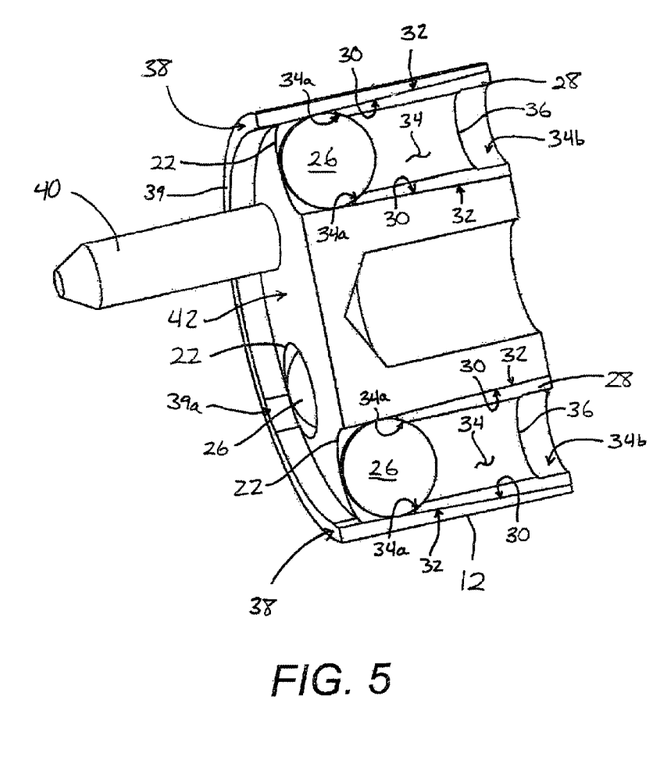
FIG. 5 is another sectional perspective view of the outer insert housing, including ball lenses and tapered sleeves in the housing passageways.
Figure 7:
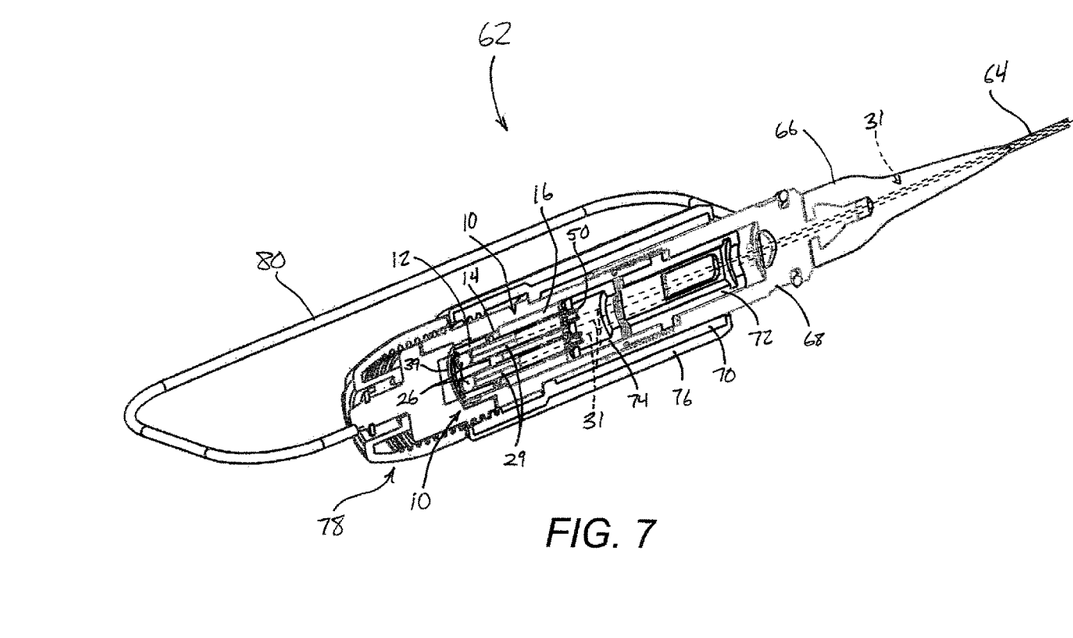
FIG. 7 is a side sectional elevation of a complete optical coupler assembly including a dust cap with lanyard, and fiber optic lines shown in phantom.

Referring now to the drawings and the illustrative embodiments depicted therein, an expanded beam optical insert 10 includes an outer insert housing 12, an inner insert 14, and a rear insert 16 (FIGS. 1 and 2), for use in an optical coupler assembly 18 (FIG. 7). Outer insert housing 12 defines a plurality of optical channels or housing passageways 20, each passageway 20 extending between a respective distal opening 22 and proximal opening 24 (FIGS. 4 and 5). Each housing passageway 20 receives a spherical ball lens 26 and a tapered barrel or sleeve 28 for holding the ball lens 26 in position in the passageway 20 at distal opening 22 (FIGS. 2-5). Each tapered sleeve 28 in each housing passageway 20 further receives an end portion of a ferrule assembly 29, which supports an optical fiber 31 that is in optical communication with lens 26 (FIG. 2), as will be described in greater detail below.

Housing passageways 20 are defined by tapered frusto-conical inner surfaces 30 of inner insert 14 (FIGS. 4 and 5). Each passageway 20 has a relatively larger inner diameter at proximal openings 24, and a relatively smaller inner diameter at distal openings 22. Housing passageways 20 are dimensioned with the inner diameter at distal opening 22 sized at least somewhat smaller than the outer diameter of ball lens 26, so that ball lenses 26 cannot be pushed fully through the distal openings 22 (FIGS. 4 and 5). Ball lenses 26 can thus be wedged in the housing passageways 20 where the inner diameter of the respective tapered inner surfaces 30 is equal to the outer diameter of the ball lenses 26.

It will be understood that ball lenses 26 contact the tapered frusto-conical inner surface 30 of passageway 20 along an annular contact patch where the inner diameter of housing passageway 20 is slightly less than the outer diameter ball lens 26. This is because of the tapered shape of inner surface 30, which dictates that the surface 30 will contact lens 26 along an annular surface tangent of the lens, the annular surface tangent located slightly forward of a great circle along the outer surface of the ball lens, and oriented perpendicularly to the longitudinal axis of housing passageway 28.

Each tapered sleeve 28 includes a forward or distal portion 28a and a rearward or proximal portion 28b. Tapered sleeves 28 have tapered frusto-conical outer surfaces 32 so that the outer diameter of tapered sleeve 28 is smaller at distal end portion 28a than at proximal end portion 28b. The angle of taper of frusto-conical outer surface 32 generally corresponds to the angle of taper of frusto-conical inner surface 30 of housing passageway 20, so that the surfaces 30, 32 engage one another as shown in FIG. 5. Tapered sleeve 28 includes a substantially constant-diameter inner cylindrical surface 34 and, in the illustrated embodiment of FIG. 5, has a bevel region 34a at distal end portion 28a, and a shoulder region 34b at proximal end portion 28b. Bevel region 34a is an annular surface that is concave to generally conform to a ring-shaped portion of the outer surface of ball lens 26. The concave surface of bevel region 34a increases the surface area over which tapered sleeve 28 engages ball lens 26. Shoulder region 34b facilitates inserting the forward end portion of ferrule assembly 29 into tapered sleeve 28 and also facilitates a press-fit operation to secure sleeve 28 and ferrule assembly 29 in housing passageway 20. A lip 36 (FIG. 5) defines the distal end of shoulder region 34b.

Tapered sleeve 28 is typically made from a softer material than outer insert housing 12 so that tapered sleeve 28 may plastically deform, such as during the installation of the tapered sleeve into housing passageway 20. For example, tapered sleeve 28 may be made from stainless steel and outer insert housing 12 may be made from ARCAP® brand non-ferrous alloy. The material of the outer insert housing 12 should be sufficiently hard so that ball lens 26 cannot deform inner surface 30 of housing passageway 20, so that ball lens 26 will only travel along the housing passageway.

Thus, distal end portion 28a of tapered sleeve 28 may deform at least partly into the annular space define between ball lens 26, inner surface 30 of housing passageway 20, and distal end portion 28a of tapered sleeve 28. In addition, outer surface 32 of tapered sleeve 28 may expand outwardly into tight contact with inner surface 30 of housing passageway 20 during the installation of tapered sleeve 28, and may further expand inwardly into tight contact with the outer surface of ferrule assembly 29, particularly in the vicinity of shoulder region 34b and lip 36 along inner surface 34. The expansion and/or deformation of tapered sleeve 28 during the installation process may result in a swage or swage-like permanent or semi-permanent coupling between tapered sleeve 28, outer insert housing 12, and ferrule assembly 29.

Outer insert housing 12 includes an annular planar mating surface 38 at the end of an annular wall 39 (FIGS. 1-5), the planar mating surface 38 for engaging a corresponding mating surface of another outer insert housing when two optical coupler assemblies 18 are assembled together. Mating surface 38 is spaced distally from the distal openings 22 of housing passageways 20 a desired distance so that ball lenses 26 are spaced a desired distance from the ball lenses 26 of another expanded beam optical insert 10 in an optical coupler assembly 18, according to lens focal length. Optionally, annular wall 39 includes notches 39a along an inner surface thereof, in proximity to each distal opening 22 and ball lens 26. By forming notches 39a along the inner surface of annular wall 39 in these locations, the chance of optical signal degradation (e.g., due to light signals passing through a ball lens and being absorbed or reflected by annular wall 39, rather than received by a corresponding ball lens) is reduced.

In the illustrated embodiment, outer insert housing 12 includes an alignment pin 40 that projects distally outwardly from a generally planar end surface 42 in which distal openings 22 are formed. A pin-receiving bore 44 is formed in planar end surface 42, directly across from alignment pin 40, so that two substantially identical outer insert housings 12 may be assembled together with their respective ball lenses 26 in proper alignment, with the alignment pin 40 of one housing engaging the corresponding bore 44 of the other housing, and vice versa. Optionally, alignment pin 40 may have a tapered tip portion 40a that facilitates the insertion of pin 40 into the pin-receiving bore 44 of another insert housing 12.

Figure 2:
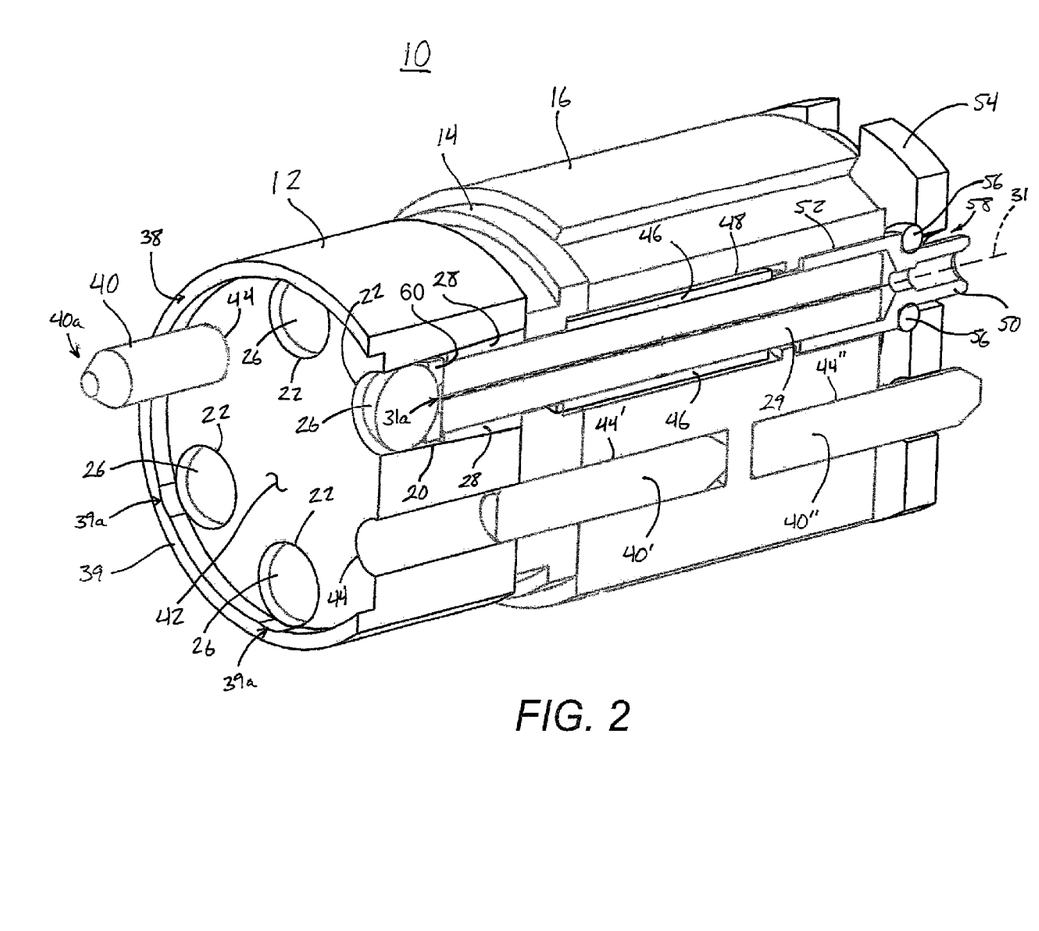
FIG. 2 is a sectional perspective view of the expanded beam optical insert taken along section line II-II in FIG. 1.
Figure 3:
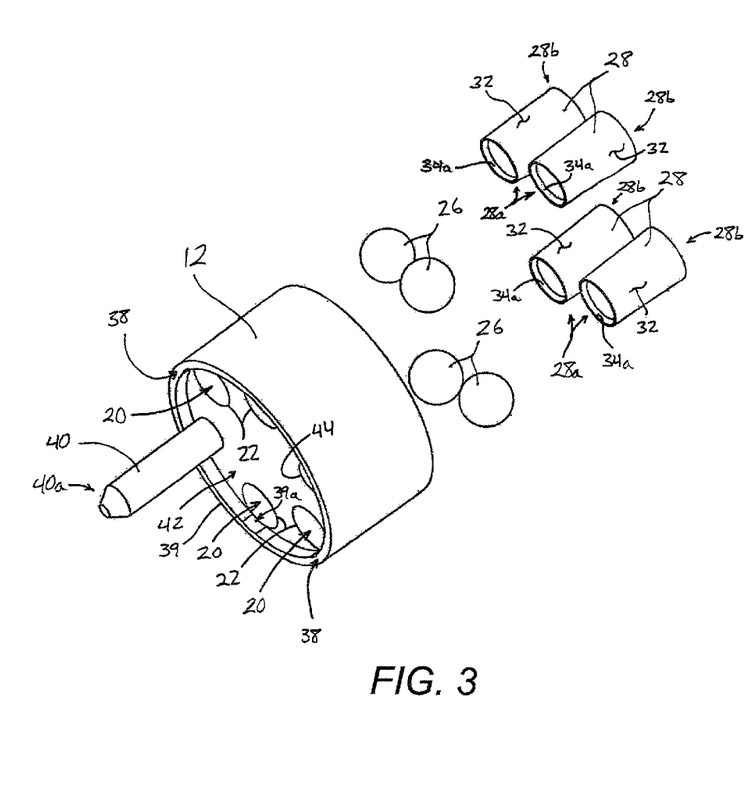
FIG. 3 is an exploded perspective view of the outer insert housing, ball lenses, and tapered sleeves of the expanded beam optical insert.

As best shown in FIG. 2, once inner insert 14 is assembled to outer insert housing 12, inner insert 14 blocks or contacts the proximal ends 28b of taper sleeves 28 to prevent possible dislocation or movement of the sleeves 28 and ferrule assemblies 29 during vibration or environmental changes around the optical insert 10. Ferrules 29 are further supported in respective tubular sleeves 46 positioned in respective inner chambers 48 of rear insert 16. Tubular sleeves are inserted into inner chambers 48 through a forward or distal end of rear insert 16, and held in place by inner insert 14. The rear or proximal end portion of ferrule assembly 29 is received in a ferrule holder 50, through which optical fiber 31 exits the optical insert 10. A forward portion of ferrule holder 50 is received in a rear inner chamber 52 of rear insert 16, and an end cap 54 is attached to the rear or proximal end of rear insert 16 to secure ferrule holder 50 in place. An O-ring seal 56 substantially limits or prevents contaminants from entering ferrule assembly 29 through an opening 58 in end cap 54, through which a rear or proximal end portion of ferrule holder 50 and optical fiber 31 exit the optical insert 10.

As noted above, outer insert housing 12 is typically made of ARCAP® or the like, which is a harder material than that of tapered sleeves 28, which are typically made of stainless steel or the like. Ferrule assemblies 29 include cylindrical bodies made of ceramic or the like, while ferrule holders 50 are typically made of any sufficiently durable and strong metal or resinous plastic material. Tubular sleeve 46, which supports the ceramic cylindrical body of ferrule assembly 29, is typically also made of ceramic material.

Optionally, an annular spacer 60 may be positioned between ball lens 26 and the distal ends of tapered sleeve 28 and ferrule assembly 29. Spacer 60 may be particularly useful such as when longer focal lengths are desired to improve transmission of multi-mode light signals, and can be made of stainless steel, for example. Optical fiber 31 typically has a polished distal end 31a where it exits or is exposed in the distal end of ferrule assembly 29 (FIG. 2), also for improved light signal transmission.

Figure 6:
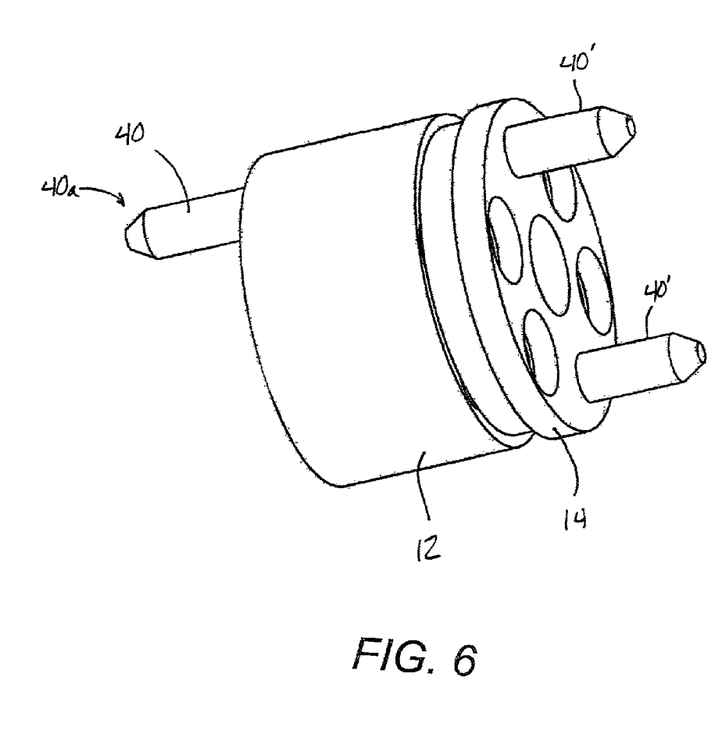
FIG. 6 is a perspective view of a portion of the outer insert housing and inner insert of the optical insert.

Additional alignment pins 40' project or extend rearwardly from inner insert 14 for engagement with pin-receiving bores 44' in the forward or distal end of rear insert 16, such as shown in FIGS. 2 and 6. A forward or distal end portion of each alignment pin 40' is received in pin-receiving bore 44, which passes entirely through outer insert housing 12 as shown in FIG. 2. Thus, alignment pins 40' ensure proper alignment of outer insert housing 12 with inner insert 14 and rear insert 16. Additional alignment pins 40" are received in pin-receiving bores 44" at the rear or proximal end of rear insert 16, and project rearwardly through end cap 54 to maintain proper alignment of end cap 54 with rear insert 16 (FIG. 2).

Referring now to FIG. 7, expanded beam optical insert 10 is shown incorporated into an optical connector assembly 62, which terminates a fiber optic line 64. A flexible dust boot and strain relief 66 secures fiber optic line 64 to connector assembly 62, which includes several concentric housings 68, 70, 72, 74, seals, and typically a soft rubber or rubberized outer casing 76 to improve the connector assembly's resistance to mechanical shock, vibration, and contamination. In the illustrated embodiment of FIG. 7, connector assembly 62 includes a dust cap 78 that substantially limits or prevents contaminants from reaching outer insert housing 12, including lenses 26, distal openings 22, and annular wall 39 and distal mating surface 38 when the connector assembly 62 is not in use. When the connector assembly 62 is to be put into use, dust cap 78 is removed (and may remain tethered to connector assembly 62 via a lanyard 80) and the connector assembly 62 may be coupled to a substantially identical connector assembly (not shown) with their respective alignment pins 40 engaging corresponding pin-receiving bores 44, and with mating surfaces 38 engaging one another so that the coupled connector assemblies are arranged substantially as a mirror image to one another.

Figure 8:
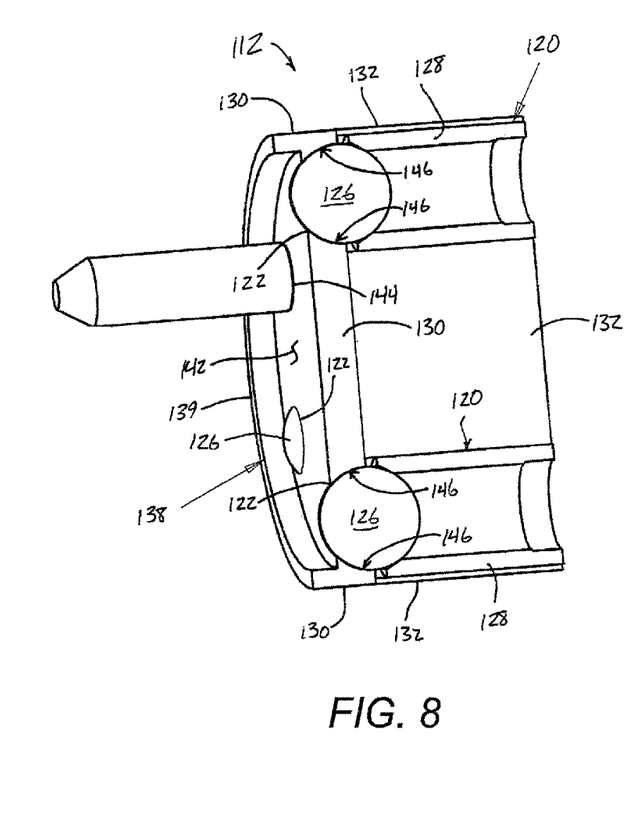
FIG. 8 is a sectional prospective view of another outer insert housing.
Figure 9A:
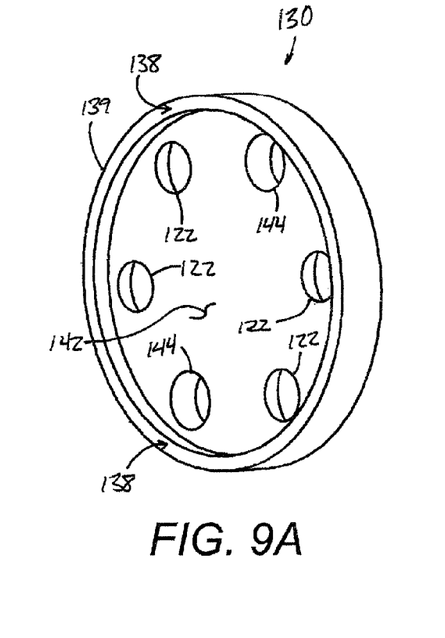
FIG. 9A is a front perspective view of the housing cap from the outer insert housing of FIG. 8.
Figure 9B:
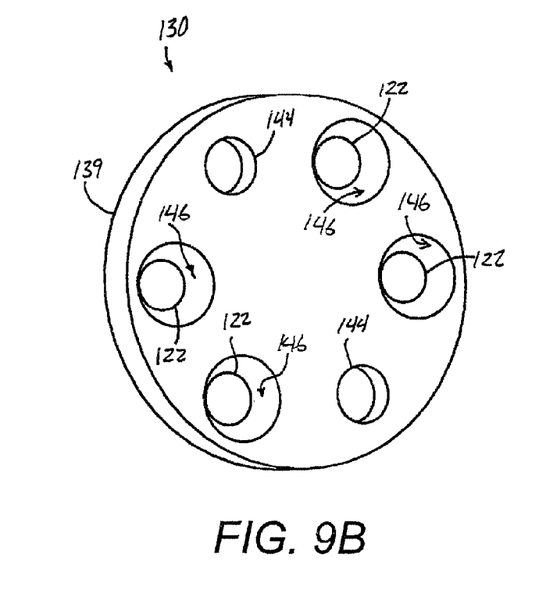
FIG. 9B is a rear perspective view of the housing cap of FIG. 9A.

Optionally, and with reference to FIGS. 8-9B, an alternative outer insert housing 112 defines a plurality of housing passageways 120 for receiving sleeves 128 and ball lenses 126 in a somewhat similar arrangement as with outer insert housing 12, described above. Unlike housing passageways 20 and tapered sleeves 28, however, housing passageways 120 have a substantially constant inner diameter and sleeves 128 have a substantially constant outer diameter. Outer insert housing 112 has a forward housing cap 130 that attaches (such as via an adhesive or other mechanical fastener or the like) to a main body 132 of insert housing 112. Housing cap 130 includes an annular wall 139 defining a forward planar mounting surface 138 spaced distally outwardly from a generally planar end surface 142. Distal openings 122 in end surface 142 have smaller diameters than ball lenses 126, so that the ball lenses can extend partially (but not entirely) through the distal openings 122.

Forward housing cap 130 defines a concave annular seat portion 146 (FIGS. 8 and 9B) between each housing passageway 120 and corresponding distal opening 122. Annular seat portions 146 are concave surfaces that generally conform or correspond to the curvature of the outer surface of each spherical ball lens 126, and are spaced a desired distance from annular mating surface 138 so that each optical lens 126 is positioned at a precise distance (focal length) for optical data transmission through the lenses of expanded beam optical insert. With ball lenses 126 installed in housing passageways 120, sleeves 128 are inserted and pressed or urged into place, which secures each ball lens 126 against a respective annular seat portion 146. Seat portions 146 are formed so that each ball lens 126 is at a precise desired location and held or fixed in that location by a respective sleeve 128.

Thus, the expanded beam optical inserts of the present invention facilitate secure connection of optical data transmission conduits with precise alignment of optical lenses. The resulting connector is resistant to contaminants, vibration, mechanical shock, and other hazards. The expanded beam optical insert does not require epoxy or other adhesives for holding the various components together, and nor does it require precise fixturing tools or other expensive equipment for achieving a desired level of precision in the optical connectors, since the ball lenses are self-aligning in the optical inserts.

Changes and modifications in the specifically-described embodiments can be carried out without departing from the principles of the present invention, which is intended to be limited only by the scope of the appended claims, as interpreted according to the principles of patent law including the doctrine of equivalents.

The invention claimed is:

1. An expanded beam optical insert for use in fiber optic couplers, said insert comprising:
   a housing defining a housing passageway with proximal and distal openings for receiving an optical conduit, said housing passageway having an inner surface that tapers in diameter from said proximal opening to said distal opening;
   a lens disposed in said housing passageway near said distal opening, said lens having a larger diameter than the diameter of said distal opening of said housing passageway so that said lens is precluded from passing through said distal opening;
   a tapered hollow sleeve positioned in said housing passageway, said sleeve having an outer surface that generally corresponds to said inner surface of said housing passageway, and said sleeve having an inner surface for receiving the optical conduit, said sleeve further having a distal end portion disposed toward said distal opening of said housing passageway and a proximal end portion disposed toward said proximal opening of said housing passageway; and
   wherein said lens is securable in a fixed position in said housing passageway, between said distal opening of said housing passageway and said distal end portion of said sleeve, via a compressive axial force applied to said proximal end portion of said sleeve in the direction of said distal opening of said housing passageway.

2. The optical insert of claim 1, wherein said housing comprises a substantially planar distal mating surface for engaging a corresponding mating surface of another optical insert, wherein the distance between said lens and said planar distal mating surface is adaptable according to the diameter of said lens and the angle of taper of said housing passageway.

3. The optical insert of claim 1, wherein said housing passageway comprises a partial-spherical annular inner surface near said distal opening, and wherein said lens comprises a spherical lens that is seated against said partial-spherical annular inner surface of said housing passageway.

4. The optical insert of claim 1, wherein said tapered inner surface of said housing passageway comprises a frusto-conical surface, and said outer surface of said tapered hollow sleeve also comprises a frusto-conical surface.

5. The optical insert of claim 1, comprising a plurality of each of said housing passageways, said lenses, and said sleeves.

6. The optical insert of claim 1, further comprising an annular spacer disposed between said lens and said distal end portion of said tapered sleeve.

7. The optical insert of claim 1, further comprising an inner insert body that engages said proximal end portion of said sleeve.

8. The optical insert of claim 7, further comprising a rear housing coupled to said inner insert body, opposite said housing.

9. The optical insert of claim 1, further comprising a forward housing cap at said housing, said forward housing cap defining said distal opening, wherein said forward housing cap is engaged by said lens.

10. The optical insert of claim 1, further comprising an alignment pin that projects distally from said housing near said distal opening of said housing passageway, said alignment pin configured to engage an alignment bore in another optical insert.

11. The optical insert of claim 10, wherein said housing defines an alignment bore near said distal opening of said housing passageway, said alignment bore configured to receive the alignment pin of another optical insert.

12. The optical insert of claim 1, further in combination with an optical connector assembly.

13. An expanded beam optical insert for use in fiber optic couplers, said insert comprising:
   a housing defining a housing passageway with proximal and distal openings for receiving an optical conduit, said housing passageway having a frusto-conical tapered inner surface that tapers in diameter from said proximal opening to said distal opening, said housing having a substantially planar distal mating surface for engaging a corresponding mating surface of another optical insert;
   a lens disposed in said housing passageway near said distal opening, said lens having a larger diameter than the diameter of said distal opening of said housing passageway so that said lens is precluded from passing through said distal opening;
   a tapered hollow sleeve positioned in said housing passageway, said sleeve having a tapered frusto-conical outer surface that generally corresponds to said inner surface of said housing passageway, and said sleeve having an inner surface for receiving the optical conduit, said sleeve further having a distal end portion disposed toward said distal opening of said housing passageway and a proximal end portion disposed toward said proximal opening of said housing passageway;
   wherein said lens is securable in a fixed position in said housing passageway, between said distal opening of said housing passageway and said distal end portion of said sleeve, via a compressive axial force applied to said proximal end portion of said sleeve in the direction of said distal opening of said housing passageway; and
   wherein the distance between said lens and said planar distal mating surface of said housing is adaptable according to the diameter of said lens and the angle of taper of said housing passageway.

14. The optical insert of claim 13, wherein said housing passageway comprises a partial-spherical annular inner surface near said distal opening, and wherein said lens comprises a spherical lens that is seated against said partial-spherical annular inner surface of said housing passageway.

15. The optical insert of claim 14, further comprising an annular spacer disposed between said lens and said distal end portion of said tapered sleeve.

16. The optical insert of claim 15, further comprising an inner insert body that engages said proximal end portion of said sleeve.

17. A method of assembling an expanded beam optical insert for use in fiber optic couplers, said method comprising:
provideing a housing defining a housing passageway with proximal and distal openings, the housing passageway having an inner surface between the openings that tapers from the proximal opening to the distal opening;
positioning a lens in the housing passageway near the distal opening, the lens having a larger diameter than the distal opening of the housing passageway so that the lens is precluded from passing through the distal opening;
positioning a tapered hollow sleeve in the housing passageway with a distal end portion of the sleeve disposed toward the distal opening of the housing passageway, the sleeve having an outer surface that corresponds to the inner surface of the housing passageway; and
applying a compressive axial force to a proximal end portion of the sleeve in the direction of the distal opening of the housing passageway to secure and align the lens in a fixed position seated in the distal opening of the housing passageway.

18. The method of claim 17, further comprising inserting an optical ferrule assembly or optical stub containing an optical fiber into the sleeve so that the lens is in optical communication with the optical conduit.

19. The method of claim 17, further comprising inserting an annular spacer in the housing passageway between the lens and the distal end portion of the sleeve.

20. The method of claim 17, wherein said applying a compressive axial force to the sleeve causes the sleeve to plastically deform.

* * * * *